Patented Dec. 18, 1945

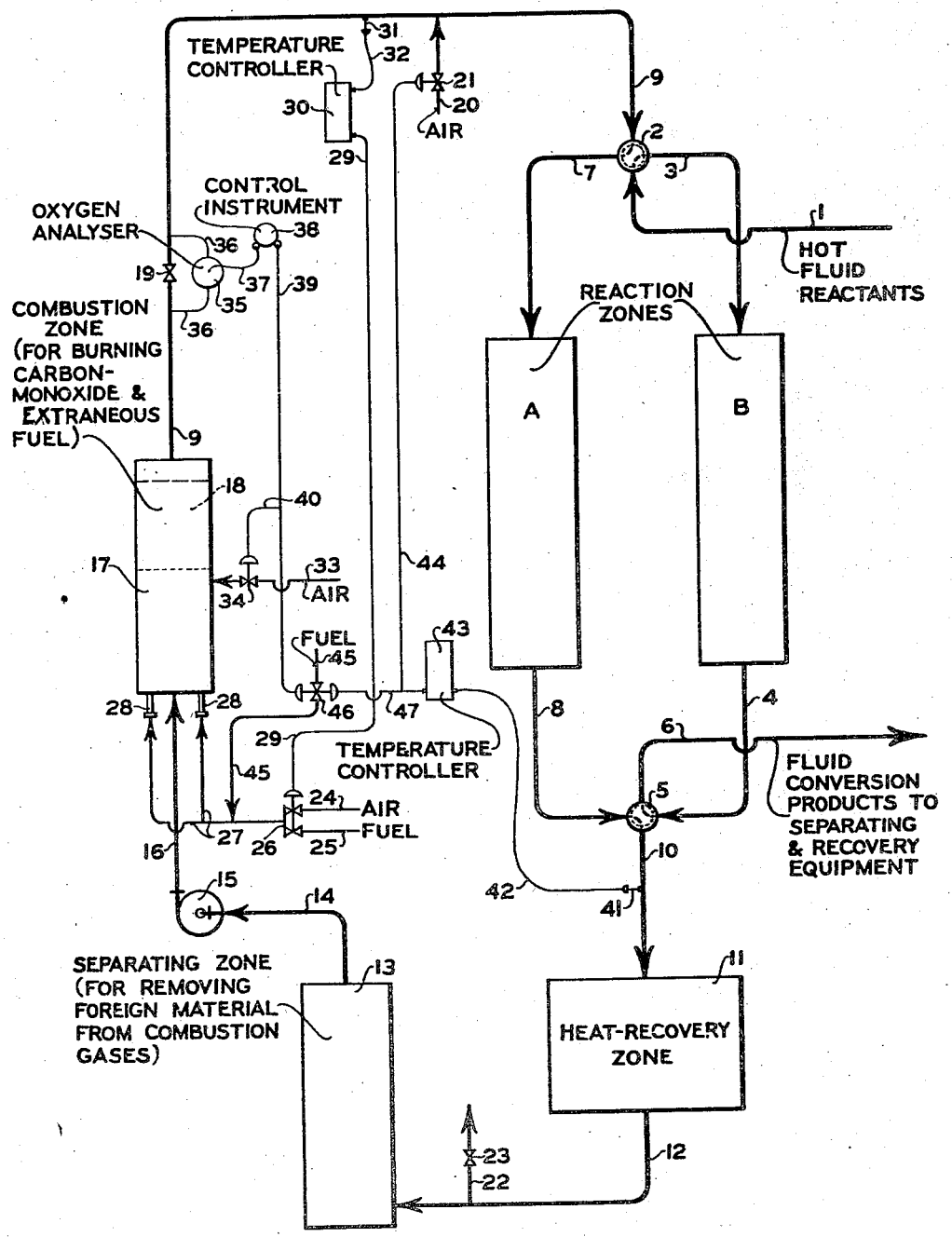

2,391,327

UNITED STATES PATENT OFFICE 2,391,327

REGENERATION OF SOLID CONTACT MATERIAL

Lev A. Mekler, Chicago, Ill., assignor to Universal Oil Products Company, Chicago, Ill., a corporation of Delaware Application July 22, 1942, Serial No. 451,967

5 Claims. (Cl. 252—242)

This invention relates to the regeneration of a mass of subdivided solid contact material of catalytic or non-catalytic nature which has become contaminated by the deposition and accumulation therein of deleterious heavy combustible materials formed during a conversion reaction previously conducted in the presence of the contact mass.

Periodic regeneration of the catalyst mass is common in many catalytically promoted hydrocarbon conversion reactions of which catalytic cracking and catalytic dehydrogenation are good examples. The conversion reaction and regeneration of the catalyst are simultaneously conducted in separate reactors with periodic alternation of the reactors with respect to the conversion and reactivating operations. To accomplish regeneration of the catalyst, a stream of hot oxygen-containing gases is passed through the reactor in contact with the contaminated catalyst to be regenerated and burns the deleterious combustible deposits therefrom. Ordinarily, due to the relatively small amount of air in the regenerating gas stream, its carbon monoxide content as it leaves the reactor is relatively high. Also, as long as any substantial amount of combustible material is being burned the temperature of the reactivating gas stream increases and its oxygen content decreases as it flows through the catalyst mass.

The regenerating gas stream commonly employed comprises combustion gases containing a relatively small amount of free oxygen and a cyclic flow of the regenerating gas stream is set up through the reactor and therefrom through suitable heat recovery and purifying equipment and through equipment wherein the temperature, free oxygen content and carbon monoxide content of the stream are each adjusted to the desired value, and thence back to the reactor wherein reactivation of the catalyst is taking place.

It is usually desirable to eliminate carbon monoxide from the regenerating gas stream supplied to the reactor or to materially reduce its carbon monoxide content. With substantial amounts of carbon monoxide present it will burn to carbon dioxide in the catalyst bed with a considerable evolution of heat. This not only decreases desired combustion of the deposited contaminants but also, due to the high heat liberation in burning carbon monoxide to carbon dioxide, the temperature of the catalyst may be increased to the point where damage or permanent impairment to its activity will result. To obviate this difficulty the carbon monoxide is preferably burned in a combustion zone located in a portion of the regenerating gas circuit exterior to the reactor. It thus serves as fuel and increases the temperature of the regenerating gas stream in this portion of the circuit.

Oxidation-promoting catalyst may be employed in the combustion zone to facilitate conversion of the carbon monoxide to carbon dioxide and air is, of course, added for this reaction. Additional fuel and air are admitted to the combustion zone to burn therein, and commingle with and further increase the temperature of the previously cooled regenerating gas stream to a level at which combustion of the deposited contaminants will take place upon its subsequent contact with the catalyst. Air, in addition to that required for combustion of the carbon monoxide and extraneous fuel, is commingled with the circulating stream of regenerating gases prior to its introduction into the reactor, in amounts regulated to give the stream the free oxygen content required for accomplishing the desired combustion of the deleterious deposits upon its contact with the catalyst.

The operation as above outlined is conventional and there are several factors which make it difficult to accurately control critical operating conditions. The methods of control heretofore employed in such a system do not take these factors into account or at least do not eliminate the difficulties arising therefrom. The present invention is addressed to an improved method of controlling the important and critical operating conditions in a regenerating system of this general class which obviates the difficulties encountered in previous practice.

The features and advantages of the invention will be made apparent with reference to the accompanying drawing and the following description thereof.

The drawing is essentially a flow diagram illustrating a process such as above outlined and to which the advantageous provisions and features of the invention are applied.

Referring to the drawing, reaction zones A and B represent alternately operated reactors each containing one or a plurality of beds of suitable catalyst or contact material, not illustrated, in the presence of which the conversion reaction to be accomplished is conducted. While the conversion reaction is taking place in reactor B, regeneration of the catalyst or contact mass is accomplished in reactor A and vice versa.

Assuming that a conversion reaction such as, for example, the catalytic cracking of hydrocarbons, is taking place in reactor B, the reactants to be converted are supplied thereto at a temperature suitable for accomplishing their desired conversion upon contact with the catalyst. They are directed in heated state through line 1 to a suitable stream directing or switching valve 2, the setting of which determines to which reactor they are supplied, and they flow in this particular instance through valve 2 and line 3 into reactor B, wherein they contact the active catalytic material disposed within this zone and are converted.

Conversion to the desired products is accompanied by the formation of relatively heavy conversion products of a carbonaceous or hydrocarbonaceous nature which accumulate on the catalyst particles as the operation progresses.

During conversion of the hydrocarbon reactants in reactor B, resulting fluid conversion products are directed from the reactor through line 4 to another suitable stream-directing or switching valve 5 wherefrom they are directed through line 6 to suitable separating and recovery equipment of any desired conventional form not pertinent to the present invention and, therefore, not illustrated.

After a period of operation, during which contaminants accumulate on the catalyst and reduce its activity to such a degree that regeneration is desirable, the setting of valves 2 and 5 is changed so that the hot fluid reactants supplied through line 1 to valve 2 are directed therefrom through line 7 to reactor A, wherein conversion of the hydrocarbon reactants is continued in the presence of the fresh or freshly generated catalyst disposed within this zone, and wherefrom resulting fluid conversion products are directed through line 8 to valve 5 and thence through line 6 to the separating and recovery equipment.

While reactor B is being employed as the conversion zone, hot reactivating gases containing controlled relatively small amounts of free oxygen and derived, as will be later described, are supplied through line 9 to valve 2 wherefrom they are directed through line 7 into reactor A and therein contact the contaminated catalyst and burn the deleterious deposits therefrom to reactivate the same. Resulting combustion gases which, during a major portion of the reactivating step, will be of increased temperature and reduced oxygen content as compared with the regenerating gas stream supplied to the reactor, are directed from reactor B through line 8 to valve 5 wherefrom they are directed through line 10 and recycled through equipment of the type and for the purpose which will be later described back to line 9 and thence to the reactor wherein regeneration of the catalyst is taking place.

During reactivation of the catalyst in reactor B the hot, oxygen-containing regenerating gas stream is directed from line 9 through valve 2 and line 3 to this reactor and resulting combustion gases discharged from reactor B through line 4 to valve 5 are directed therefrom through that portion of the regenerating gas circuit exterior to the reactors and back through line 9 to the reaction zone wherein regeneration is taking place.

The reactivating gas stream supplied to line 10 will be at a higher temperature than that desired in the reactivating gas stream supplied through line 9 to the reaction zone in which regeneration is taking place and a considerable quantity of useful heat may be readily recovered therefrom. It is therefore directed from line 10 to a heat recovery zone 11 which may comprise, for example, a waste-heat boiler, steam superheater, hot gas turbine or any other suitable equipment for recovering energy from the gases.

The resulting cooled or partially cooled combustion gases are directed in part, through line 12 to a separating zone 13 wherein foreign materials, such as ash, catalyst dust, tars and the like are separated from the combustion gases. The separating equipment may comprise a filter or a dust separator of either the cyclone or the Cottrell type or a scrubbing column wherein the gases are washed with water or any other suitable liquid or, when required, a combination of such separating means may be employed.

The gases substantially freed of deleterious foreign materials in separating zone 13 are directed therefrom through line 14 to suitable propulsion means 15, such as a blower or compressor, which serves to maintain the desired relatively high rate of circulation in the regenerating gas circuit and wherefrom the relatively clean and relatively cool gases are supplied through line 16 to combustion zone 17.

The combustion zone may be of any suitable form and, as here employed, serves as a zone wherein a fuel-air mixture supplied thereto from an external source is burned and commingled with the circulating stream of reactivating gases and wherein carbon monoxide components of the regenerating gas stream are converted to carbon dioxide by oxidation in air. In the case illustrated, the lower portion of the combustion zone is employed for combustion of the extraneous fuel and the upper portion thereof contains a bed 18 of suitable oxidation-promoting contact material which assists conversion of the carbon monoxide. Oxidation of the carbon monoxide generates a substantial quantity of heat and thus serves as a means of increasing the temperature of the previously cooled circulating stream of regenerating gases prior to their reintroduction into contact with the catalyst undergoing regeneration, and sufficient additional fuel is burned in the combustion zone to further increase the temperature of the regenerating gas stream to the desired value for initiating combustion of the deleterious material deposited on the catalyst upon contact of the reheated, regenerating gas stream therewith.

The reheated, regenerating gas stream from combustion zone 17 is directed through line 9 to valve 2 wherefrom it is supplied, as previously described, to the reactor wherein regeneration is taking place. Regulated quantities of air, in addition to that supplied to the combustion zone 17, are commingled with the stream of reheated, regenerating gases as they pass through line 9 to bring their free oxygen content to the desired value for burning the deleterious deposits from the catalyst mass. This additional air is admitted to line 9 through line 20, controlled by valve 21.

To maintain a substantially constant volume of regenerating gases in the circuit, a quantity thereof, regulated to compensate for the quantity of fresh combustion gases generated in zone 17, is removed from line 12 and from the system through line 22 and valve 23.

Air and fuel from an external source, forming the mixture of these materials burned in combustion zone 17 to increase the temperature of the combustion gas stream to the desired value prior to its introduction into contact with the contaminated catalyst, are supplied through the respective lines 24 and 25 to flow control means whereby the total quantity of the mixture supplied to the combustion zone may be varied while maintaining a substantially constant ratio of air to fuel in this mixture. Any suitable device for accomplishing this may be employed and, in the particular case here illustrated, a stream proportioning valve 26 is employed to which the air from line 24 and the fuel from line 25 are supplied and wherein the desired predetermined ratio of air to fuel is maintained whether the valve is in fully open or partially closed position and regardless of the degree of throttling. The thus proportioned mixture is supplied from valve 26 through line 27 to one or a plurality of suitable burners 28 through which it is supplied to combustion zone 17 and burned therein.

Valve 26, as previously indicated, is a throttling type of automatic control valve and is actuated through line 29 from a suitable temperature control instrument 30 which may be a potentiometer type controller or a controller of any other suitable form through which control of valve 26 is accomplished in response to minor changes in the temperature of the combustion gas stream passing through line 9 from combustion zone 17 to the reactor wherein reactivation is being accomplished, impulses resulting from such temperature changes being transmitted from a thermocouple or other suitable temperature sensitive device 31 in line 9 to the control instrument 30 through line 32. Thus, the quantity of the fuel-air mixture supplied through valve 26 to the combustion zone is regulated in response to minor changes in the temperature of the combustion gas stream being supplied to the catalyst bed undergoing regeneration, maintaining said temperature substantially constant while maintaining a substantially constant ratio of air to fuel in the mixture supplied through valve 26.

The setting of valve 26 with respect to the air-fuel ratio is such that there will be no considerable proportion of excess air over that required for complete combustion of the fuel in zone 17, since the regenerating gas stream supplied to the combustion zone will normally contain some residual free oxygen. As a feature of the invention the air supplied through line 24 is preferably kept slightly below that required for complete combustion of the fuel supplied through line 25 and, when required, additional air is separately supplied to the combustion zone through line 33 and valve 34, being controlled, as will be later described. The total air supplied to zone 17, including that not utilized in the regenerating zone and recycled with the regenerating gas stream to the combustion zone, is kept slightly in excess of that required for complete combustion of the total fuel supplied to the combustion zone, including the carbon monoxide.

As another feature of the invention, a valve 19 is interposed in line 9 and an oxygen analyzer 35 is interposed in line 36, by-passing valve 19, whereby valve 19 may be closed a regulated amount or entirely to send a portion or all of the effluent gases from combustion zone 17 through the oxygen analyzer. The oxygen analyzer 35 may be of any desired type capable of measuring the free oxygen content of the combustion gases discharged from zone 17, this being accomplished, for example, by measuring the temperature rise which occurs in the stream of gases passing through the analyzer when a fuel of predetermined, substantially constant calorific value is supplied thereto and burned in the free oxygen present. Impulses from the oxygen analyzer are transmitted through line 37 to a control instrument 38 of any suitable form which translates the impulse from the oxygen analyzer and functions to open valve 34 in air line 33 when the free oxygen content of the stream analyzed reaches a predetermined low value and to close valve 34 when the free oxygen content of this stream reaches a predetermined higher value, the actuating mechanism of valve 34 being connected with control instrument 38 through lines 39 and 40.

In accordance with the invention the oxygen analyser and the control instrument are set to maintain the proportion of free oxygen in the reactivating gas stream discharged from combustion zone 17 at a value less than that desired in the combustion gas stream contacted with the catalyst undergoing regeneration but sufficient to insure substantially complete combustion in zone 17 of the extraneous fuel supplied thereto and substantially complete conversion of carbon monoxide to carbon dioxide in this zone.

As previously indicated, during a major portion of the reactivating period in each reactor and so long as substantial quantities of combustible contaminants remain in and are being burned from the catalyst undergoing regeneration, the temperature of the regenerating gas stream flowing through the catalyst mass will increase and its free oxygen content will be reduced with respect to that of the regenerating gas stream entering the catalyst mass. During this major portion of the reactivating step the temperature rise in the stream of reactivating gases as they pass through the catalyst mass is an indication of the free oxygen concentration in the regenerating gas stream entering the catalyst mass since the inlet temperature and rate of circulation of this stream is maintained substantially constant and the rate of heat liberation will increase with increasing quantities of free oxygen in the stream. It is highly desirable and often essential to limit this temperature rise in order to prevent overheating and damage to the catalyst during its reactivation. This is accomplished by controlling the amount of air admitted to line 9 through line 20 and valve 21 in response and in inverse relation to variations in the temperature prevailing in the regenerating zone. This temperature may be measured at one or a plurality of points in the catalyst mass or an indication thereof may be had by determining the temperature of the regenerating gas stream between its point of discharge from the reactor and its point of introduction into the heat recovery zone. In the particular case illustrated, a thermocouple or other suitable temperature-sensitive device 41 in line 10 is employed to determine increases and decreases in the temperature prevailing in the catalyst mass. This thermocouple transmits impulses through line 42 to a potentiometer controller or other suitable type of temperature control instrument 43 which is connected with the actuating mechanism of control valve 21 through line 44 and serves to adjust the setting of valve 21 in response to the impulses transmitted thereto from thermocouple 41, the valve being of the throttling type and being gradually closed as the temperature in line 10 increases and gradually opened as the temperature in line 10 decreases to a predetermined minimum.

As regeneration of the catalyst progresses, the amount of combustible contaminating material in the catalyst mass progressively decreases and as regeneration nears completion and the quantity of combustible material to be burned from the catalyst falls below that required to consume the free oxygen in the regenerating gas stream supplied thereto, a concentration of oxygen will build up in the combustion gas circuit if air continues to be admitted through line 20 and valve 21. Also, since little or no combustible contaminants remain to be burned from the catalyst mass and less heat is generated therein, the temperature of the combustion gas stream in line 10 will decrease. This, according to the functioning of control instrument 43, as above outlined, would further open valve 21 and admit more air to line 9. Such a condition is highly undesirable since the reactivating gas stream is about to be switched from the reactor in which regeneration has been completed to the reactor in which the conversion reaction has been taking place and, if reactivating gases of unusually high oxygen content are supplied to the latter zone to regenerate the contaminated catalyst therein, burning of the combustible material will be rapid and may result in the development of excessively high temperature in this zone and damage to the catalyst. Therefore, in accordance with the provisions of the invention the control instrument 43 functions to close valve 21 and discontinue the supply of air through line 20 to line 9 when the temperature at thermocouple 41 falls to a predetermined value below the range normally prevailing during the major portion of the reactivating step.

As another special feature of the invention, in order to consume the excess oxygen accumulated in the regenerating gas stream discharged from the catalyst mass in which regeneration has been completed or substantially completed, the aforementioned abnormal decrease in temperature at thermocouple 41 functions through control instrument 43 to admit additional fuel from an external source to the combustion zone 17 through line 45 and valve 46 communicating with line 27, the control instrument 43 being connected with the actuating mechanism of valve 46 through line 47.

Thus, as the oxygen concentration builds up in the regenerating gas stream the air supplied to this stream through line 20 is discontinued and additional fuel for consuming the excess oxygen is supplied to and burned in zone 17. This tends to bring the oxygen concentration back to the desired value and to insure this, I provide an additional control for valve 46 which supplements the control exerted thereon by instrument 43 and closes valve 46 when the oxygen concentration of the regenerating gas stream discharged from combustion zone 17 decreases to the predetermined relatively low value, above mentioned, at which control instrument 38 is set to operate.

The control exerted on valve 46 by instrument 38 is reverse-acting both with respect to that exerted on valve 46 by instrument 43 and with respect to the control exerted on valve 34 by instrument 38. Thus, when controller 38 functions to close valve 46 it opens the valve 34, and vice versa, and valve 46 is only opened by impulses from controller 43 and only closed by impulses from instrument 38.

It will be apparent from the above that the systems of control herein provided for the reactivating process not only function to maintain the desired temperature and free oxygen concentration in the regenerating gas stream supplied to the mass of catalyst or contact material during the major portion of the regenerating step in each reactor and to keep this stream substantially free of carbon monoxide but it also functions to prevent any undesirable decrease in the temperature and increase in the oxygen concentration of the regenerating gas stream supplied to the bed of catalyst or contact material during the final stage of the regenerating step in each reactor and the initial stage of the subsequent regenerating step in the other reactor.

It will also be apparent that the various control features provided are, in the most inclusive embodiment of the invention, interdependent and cooperative. However, the invention is not limited to the use of all of the controls provided in combination, since lesser combinations thereof are believed to be novel and may be employed to advantage in some instances.

The general flow or circuit of the regenerating gas stream illustrated and above described is not claimed herein per se, and numerous modifications and departures from the specific flow illustrated and described may be employed within the skill of one familiar with the art and without departing from the scope of the invention.

No specific form or construction of the various control instruments, valves, thermostats and the like is claimed as a novel part of the invention. The invention is rather directed to the interdependent and cooperative system of controls provided which may be accomplished by a novel combination of well known instrumentalities and any of several specific forms or types capable of accomplishing the desired result may be selected by those familiar with the art in the light of the foregoing explanation of their intended functions.

The following is an example of one specific operation of the process provided by the invention, as applied to the regeneration of a contaminated cracking catalyst of the silica-alumina type.

When regeneration of the catalyst is started, in reactor A for example, the fuel-air proportioning valve 26 which admits combustion from an external source to zone 17, valve 34 which admits auxiliary air to zone 17 and valve 21 which admits air to line 9 are all open. As long as normal regeneration continues in this reactor valves 26, 34 and 21 float in a throttling position, governed by the respective control instruments 30, 38 and 43, to maintain a substantially constant temperature, oxygen concentration and low carbon dioxide content in the regenerating gas stream entering the reactor.

In this particular operation the temperature of the regenerating gas stream entering the reactor is kept at about 850° F. by controlling the quantity of the fuel-air mixture admitted to zone 17 thru valve 26 in response and in inverse relation to minor variations in the temperature at thermocouple 31 in line 9. The air admitted thru valve 34 to zone 17 is varied in response and in inverse relations to minor variations in the free oxygen content of the gas stream leaving zone 17 to keep a free oxygen content of this stream at about 0.5%, thus insuring substantially complete conversion of carbon monoxide to carbon dioxide in zone 17. The free oxygen concentration in the stream of regenerating gas entering the reactor is varied in response and in inverse relation to minor variations in the temperature of the catalyst bed undergoing regeneration as indicated by thermocouple 41 in line 10. In this particular operation the temperature at thermocouple 41 is kept at about 1200° F. and to do this the air admitted thru valve 21 to line 9 may be varied from about 10% to the maximum of about 20% of the regenerating gas stream, the air concentration usually increasing slightly as the operation progresses and the quantity of combustible material on the catalyst decreases.

Now, near the end of the regeneration in reactor A, the temperature of the outgoing regenerating gas stream will begin to fall rather rapidly. When this temperature recedes to say about 1150° F., instrument 43 instead of opening valve 21 to a greater extent will function to close this valve and will also open valve 46 in the auxiliary fuel line 45 to admit more fuel to zone 17 for consuming the oxygen which is now passing thru the regenerator, since little or no combustion contaminants remain to be burned from the catalyst. Usually about the same time instrument 38 will close valve 34. Circulation will be maintained for a time with valve 46 open and valves 34 and 21 closed until the oxygen concentration in the gas leaving zone 17 drops to below the previously mentioned value to about 0.5%. Then instrument 38 closes valve 46 and begins to open valve 34 to bring the oxygen concentration up to about 0.5% and maintain it at approximately this value. Then the switch is made and regeneration of the catalyst in reactor B is started, the above described operating cycle being repeated as regeneration progresses in this zone.

I claim as my invention:

1. In the regeneration of a mass of solid contact material by contacting the same with a stream of hot combustion gases containing a regulated minor amount of air, to burn from the mass deleterious combustible materials which have been previously deposited therein, wherein regenerating gases discharged from said mass are recycled thereto through a cooling zone, wherein useful heat is recovered from the gases, and thereafter through a combustion zone, wherein carbon monoxide components of the gases are converted to carbon dioxide and wherein a fuel-air mixture supplied thereto from an external source is burned and the resulting hot combustion gases commingled with the circulating stream, the improved method of substantially eliminating carbon monoxide from and maintaining a substantially constant temperature and free oxygen content in the stream of regenerating gases supplied to the contact mass during a major portion of the regenerating operation, which comprises regulating the quantity of said fuel-air mixture supplied to the combustion zone to keep the temperature of the gases discharged therefrom substantially constant, while maintaining in said mixture a substantially fixed ratio of air to fuel somewhat less than that required for complete combustion of the fuel, supplying additional air to the combustion zone to insure complete combustion of the fuel and oxidization of the carbon monoxide to carbon dioxide so long as the free oxygen concentration in the gases discharged from the combustion zone does not exceed a predetermined maximum value less than that desired in the gases supplied to the contact mass, commingling with the gases passing from the combustion zone to the contact mass another additional quantity of air regulated to maintain a substantially constant predetermined maximum temperature in the contact mass, discontinuing admission of the last named additional quantity of air to the circulating gas stream near the end of the regenerating operation when the temperature prevailing in the contact mass falls to a predetermined subnormal value, and simultaneously supplying additional fuel to the combustion zone to consume free oxygen accumulated in the circulating gas stream supplied to the combustion zone.

2. A process such as defined in claim 1, which includes the further step of discontinuing the supply of said additional fuel to the combustion zone when the free oxygen content in the gases being discharged therefrom decreases to said predetermined minimum value.

3. In the regeneration of a mass of solid contact material by contacting the same with a stream of hot combustion gases containing a regulated minor amount of air, to burn from the mass deleterious combustible materials which have been previously deposited therein, wherein regenerating gases discharged from said mass are recycled thereto through a cooling zone, wherein useful heat is recovered from the gases, and thereafter through a combustion zone, wherein carbon monoxide components of the gases are converted to carbon dioxide and wherein a fuel-air mixture supplied thereto from an external source is burned and the resulting hot combustion gases commingled with the circulating stream, the improved method of substantially eliminating carbon monoxide from and maintaining a substantially constant temperature and free oxygen content in the stream of regenerating gases supplied to the contact mass during a major portion of the regenerating operation, which comprises, controlling the quantity of said fuel-air mixture in response and in inverse relation to variations in the temperature of the gases being supplied from the combustion zone to the contact mass, while maintaining in said mixture a substantially constant air-fuel ratio somewhat less than that required for complete combustion of the fuel, maintaining the free oxygen concentration in the gases discharged from the combustion zone between a predetermined minimum and maximum value by admitting additional air to the combustion zone when the minimum value is reached and discontinuing said supply of additional air when the maximum value is reached, and commingling another additional quantity of air with the regenerating gases subsequent to their discharge from the combustion zone and prior to their contact with said mass in quantities controlled in response and in inverse relation to minor variations in the temperature prevailing in said mass.

4. A process such as defined in claim 3, which includes the additional steps of discontinuing admission of the last named additional air to said stream and supplying additional fuel to the combustion zone toward the end of the reactivating operation in response to a drop in the temperature prevailing in said mass to a predetermined subnormal level.

5. A process such as defined in claim 3, which includes the steps of discontinuing admission of the last named additional air to said stream and supplying additional fuel to the combustion zone toward the end of the reactivating operation in response to a drop in the temperature prevailing in said mass to a predetermined subnormal level, and discontinuing the supply of said additional fuel to the combustion zone when the free oxygen concentration of the gases discharged therefrom falls to the aforesaid predetermined minimum value.

LEV A. MEKLER.